(12) United States Patent
Elliott et al.

(10) Patent No.: US 10,384,765 B2
(45) Date of Patent: Aug. 20, 2019

(54) INTERCONNECT DRIVE SYSTEM

(71) Applicant: Bell Helicopter Textron Inc., Fort Worth, TX (US)

(72) Inventors: David Elliott, Azle, TX (US); Frank Bradley Stamps, Colleyville, TX (US); Bobby Collins, Bedford, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 166 days.

(21) Appl. No.: 15/495,762

(22) Filed: Apr. 24, 2017

(65) Prior Publication Data

US 2017/0297679 A1     Oct. 19, 2017

Related U.S. Application Data

(63) Continuation-in-part of application No. 14/174,004, filed on Feb. 6, 2014, now Pat. No. 9,889,927.

(51) Int. Cl.
*B64C 19/00* (2006.01)
*F16D 48/06* (2006.01)
(Continued)

(52) U.S. Cl.
CPC .............. *B64C 19/00* (2013.01); *B64C 11/50* (2013.01); *B64C 27/001* (2013.01);
(Continued)

(58) Field of Classification Search
CPC ....... B64C 19/00; B64C 27/001; B64C 27/30; B64C 11/50; B64C 29/0033;
(Continued)

(56) References Cited

U.S. PATENT DOCUMENTS 2,462,824 A     2/1949   Zimmerman et al.
8,201,772 B2    6/2012   Wendelsdorf et al.
(Continued)

FOREIGN PATENT DOCUMENTS

DE     102013209538 A1    11/2014
EP         2930398 A1    10/2015

OTHER PUBLICATIONS

European Search Report in related European Patent Application No. 17204970.2, dated May 28, 2018, 4 pages.

*Primary Examiner* — John C Hong
(74) *Attorney, Agent, or Firm* — Lightfoot & Alford PLLC

(57) ABSTRACT

An interconnect drive system for an aircraft has a driveline and clutch control system. The driveline comprises a shaft for each propulsion assembly, each shaft for transferring torque to and from the associated propulsion assembly, and a clutch operably coupling the shafts and configured for selective engagement. The clutch is capable of transferring a first amount of torque between the shafts while engaged and a second amount of torque between the shafts while disengaged. The system also has a clutch control system, comprising a computer operably connected to the clutch for controlling operation of the clutch and sensors for sensing torque applied to the driveline, output from the sensors being communicated to the computer. The computer commands operation of the clutch in response to the output from the sensors, the clutch being commanded to disengage to relieve a transient torque imbalance in the driveline.

9 Claims, 8 Drawing Sheets

(51) Int. Cl.
*B64D 15/04* (2006.01)
*B64C 29/00* (2006.01)
*B64D 35/04* (2006.01)
*B64C 11/50* (2006.01)
*B64C 27/00* (2006.01)
*B64D 35/08* (2006.01)
*G10K 11/178* (2006.01)
*B64C 27/30* (2006.01)

(52) U.S. Cl.
CPC .......... *B64C 29/0033* (2013.01); *B64D 35/04* (2013.01); *B64D 35/08* (2013.01); *F16D 48/06* (2013.01); *G10K 11/178* (2013.01); *B64C 27/30* (2013.01); *B64C 2027/004* (2013.01); *F16D 2500/1045* (2013.01); *F16D 2500/10412* (2013.01); *F16D 2500/30412* (2013.01); *F16D 2500/50287* (2013.01); *G10K 2210/123* (2013.01); *G10K 2210/1281* (2013.01)

(58) Field of Classification Search
CPC .. B64C 2027/004; B64D 35/08; B64D 35/04; G10K 2210/1281; G10K 11/178; G10K 2210/123; F16D 2500/50287; F16D 2500/10412; F16D 2500/1045; F16D 2500/30412; F16D 48/06
See application file for complete search history.

(56) References Cited

U.S. PATENT DOCUMENTS

| | | |
|---|---|---|
| 9,964,184 B2 * | 5/2018 | Modrzejewski .......... F16H 3/58 |
| 2007/0205321 A1 | 9/2007 | Waide |
| 2015/0217863 A1 | 8/2015 | Modrzejewski et al. |
| 2016/0229531 A1 | 8/2016 | Robertson et al. |

* cited by examiner

INTERCONNECT DRIVE SYSTEM

CROSS-REFERENCE TO RELATED APPLICATIONS

This application is a continuation-in-part of prior application Ser. No. 14/174,004 ("'004 application" herein), filed 6 Feb. 2014 and titled "Variable Hub-to-Hub Phasing Rotor System," the content of which is incorporated by reference in its entirety.

BACKGROUND

Tiltrotor aircraft, such as the Bell Boeing V-22 Osprey and Bell V-280 Valor, have proprotors on opposing sides of the aircraft that are selectively pivotable between a vertical orientation for rotor-borne flight (helicopter mode) and a horizontal orientation for wing-borne flight (airplane mode). Typically, each proprotor is driven in rotation by an associated propulsion assembly, comprising an engine, a gearbox, and a transmission. The transmissions of the propulsion assemblies are connected with an interconnect driveshaft to allow the engine of one propulsion assembly to drive rotation of both proprotors, thus providing redundancy and allowing for continued flight if the engine of either propulsion assembly becomes inoperative.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure divulges an interconnect drive system configured to minimize flight-maneuver-induced loads in an interconnect driveline that couples multiple proprotors of a tiltrotor aircraft. However, this drive system may be configured for use with other types of aircraft having an interconnect driveline operably coupling multiple rotors or propellers.

Figure 1:
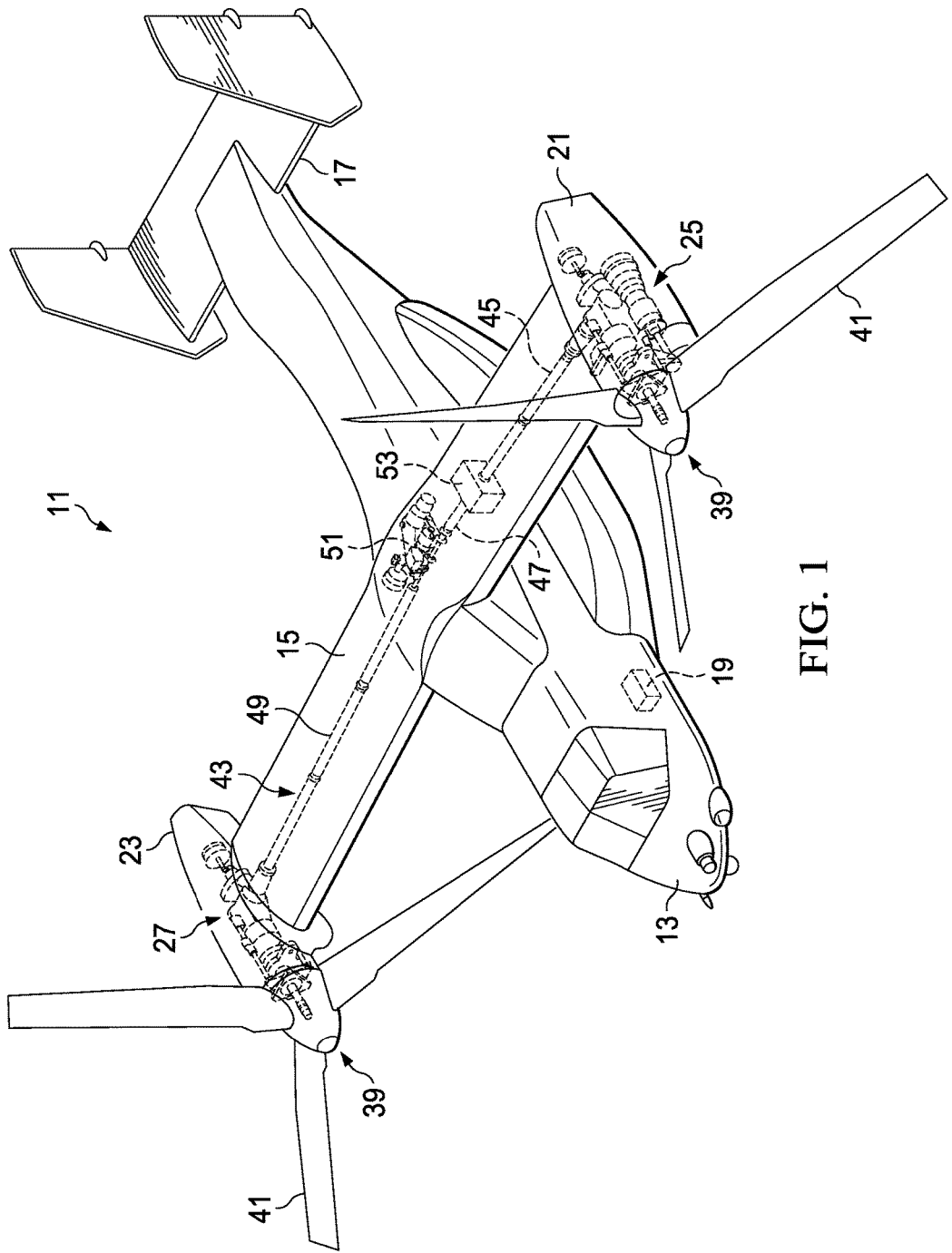
FIG. 1 is an oblique view of a tiltrotor aircraft comprising an embodiment of an interconnect drive system according to this disclosure.
Figure 2:
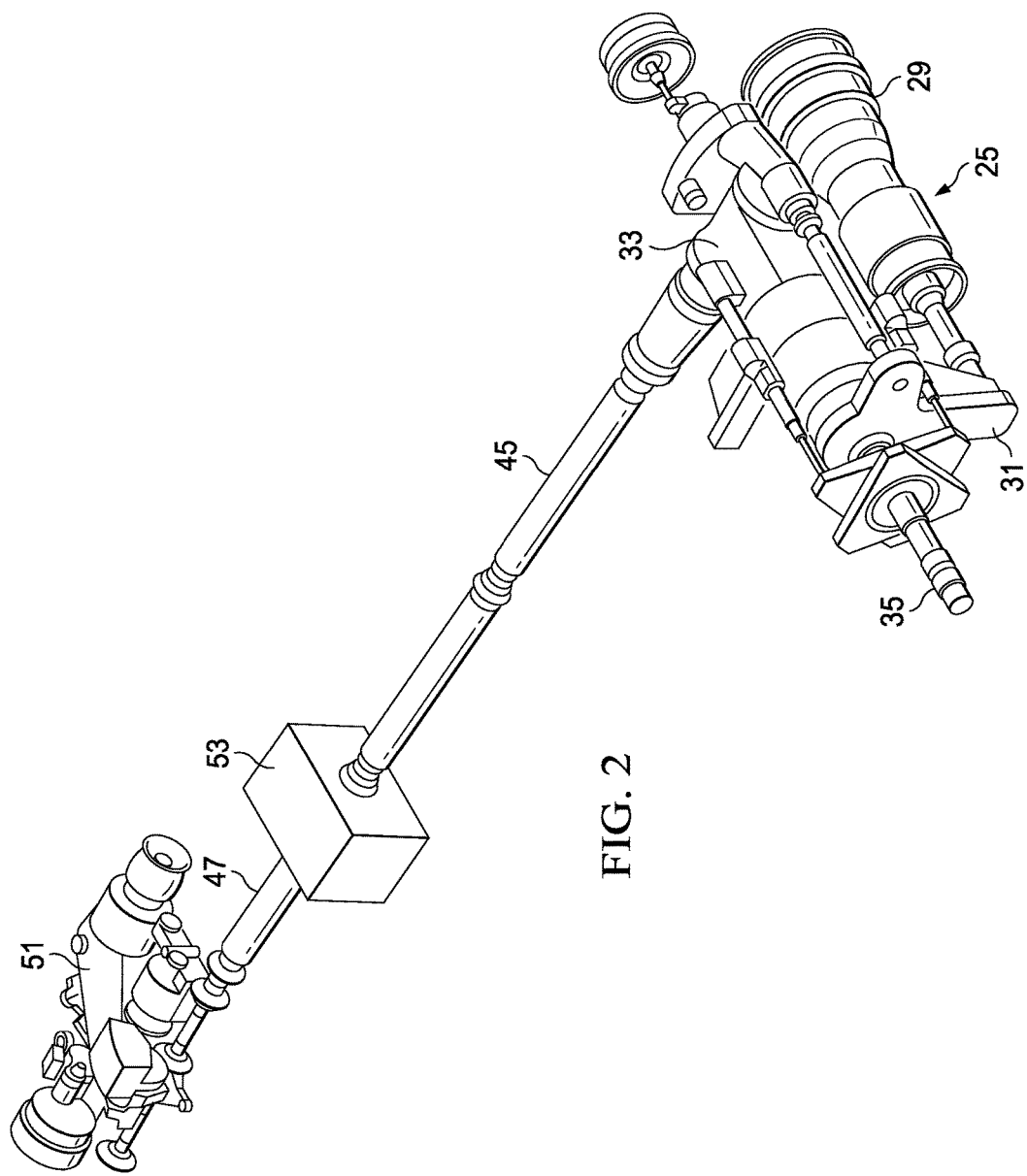
FIG. 2 is an oblique view of a portion of the drive system of the aircraft of FIG. 1.
Figure 3:
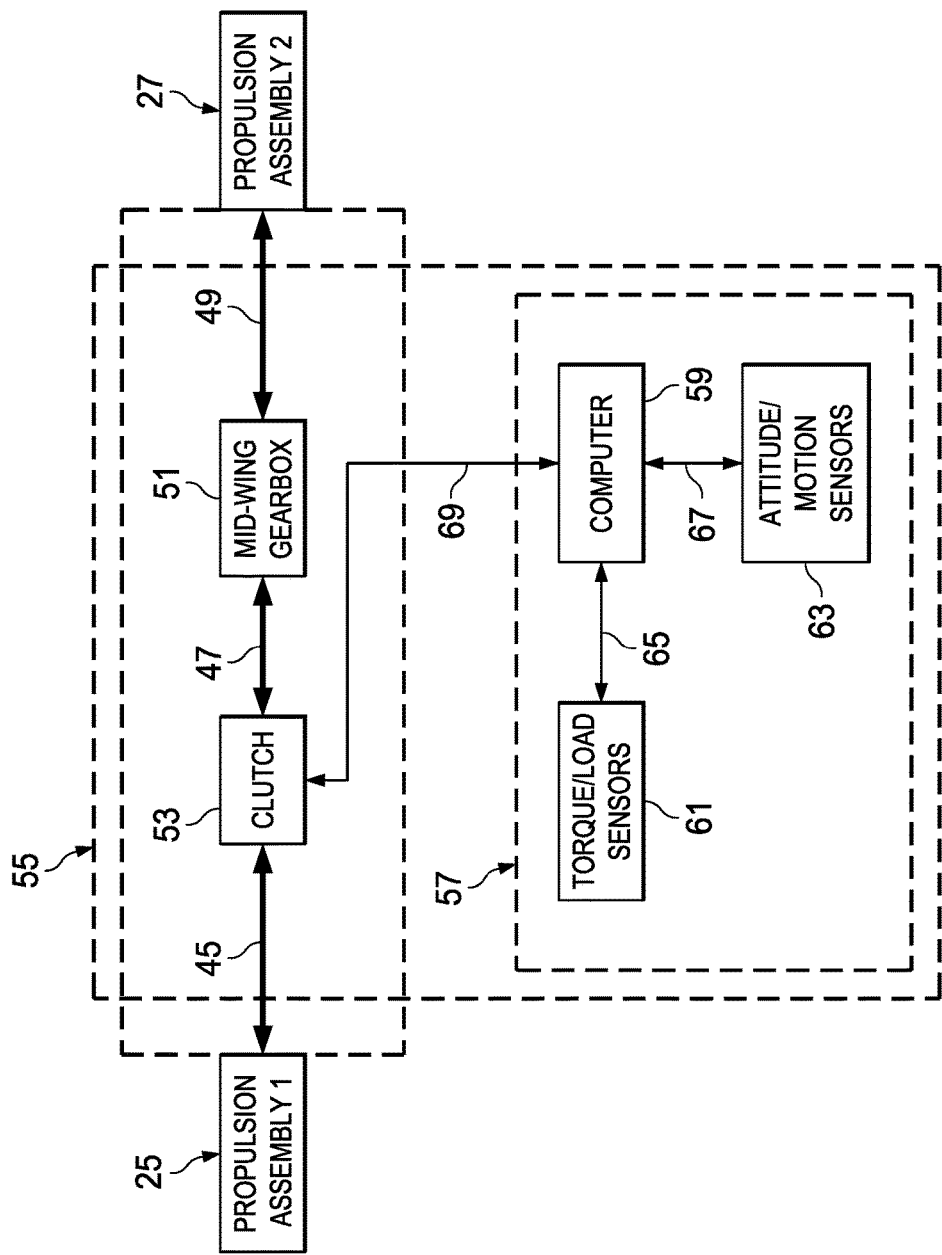
FIG. 3 is a schematic view of the drive system of the aircraft of FIG. 1.

FIG. 1 illustrates tiltrotor aircraft 11 having an interconnect drive system according to this disclosure, FIG. 2 illustrates a portion of the system, and FIG. 3 schematically illustrates the system.

Referring to FIGS. 1 and 2, aircraft 11 comprises fuselage 13, wing 15, and tail section 17. An electronic flight-control system 19 is shown located in fuselage 13. Nacelles 21, 23 are each pivotally mounted on opposing sides of fuselage 13 and, in this embodiment, on opposing ends of wing 15. Nacelle 21 houses propulsion assembly 25, and nacelle 23 houses propulsion assembly 27, each propulsion assembly 25, 27 comprising an engine 29, a gearbox 31, and a transmission 33. Gearbox 31 is configured for transferring torque from the associated engine 29 to a mast 35 for rotating an attached proprotor 39, each proprotor 39 being an assembly having multiple blades 41. Each mast 35 also transfers torque to the associated transmission 33. Each nacelle 21, 23 is pivotable relative to wing 15 for selectively moving propulsion assemblies 25, 27 and proprotors 39 between a vertical orientation in helicopter mode and a horizontal orientation in airplane mode. All propulsion assemblies according to this disclosure may alternatively be configured with electric motors to produce torque for driving proprotors 39, and electric versions may eliminate some components, such as, for example, gearbox 31.

Transmissions 33 are operably connected to each other by an interconnect driveline 43, comprising driveshafts 45, 47, 49, mid-wing gearbox 51, and clutch 53. Interconnect driveline 43 is configured to transmit engine torque from transmission 33 of one of propulsion assemblies 25, 27 to transmission 33 of the other propulsion assembly 25, 27, allowing one engine 29 to drive both proprotors 39 for continued flight during one-engine inoperative conditions. Torque transmitted by driveline 43 through mid-wing gearbox 51 also supplies power to operate auxiliary systems. In this embodiment, clutch 53 is positioned between driveshaft 45 and driveshaft 47 for operably coupling propulsion assembly 25 to mid-wing gearbox 51, although clutch 53 could alternatively be positioned in driveline 43 between propulsion assembly 27 and mid-wing gearbox 51.

In addition to transferring torque from engines 29, interconnect driveline 43 directly couples proprotors 39 for maintaining a selected phasing of proprotors 39 relative to each other. As shown and described in the '004 application, clutch 53 may be used to asymmetrically index, or "phase," proprotors 39 for minimizing vibrations during operation of propulsion assemblies 25, 27. As they counterrotate in airplane-mode flight, proprotors 39 may be phased relative to each other to an asymmetric, out-of-phase positioning or returned to symmetric, in-phase positioning. This is described in the '004 application as being accomplished by disengaging clutch 53 for a predetermined amount of time to achieve a selected phasing angle, which is preferably, for example, 0 degrees or 60 degrees for three-blade proprotors 39, 0 degrees or 45 degrees for four-blade proprotors (not shown), etc. An out-of-phase positioning causes each blade 41 of one of proprotors 39 to pass fuselage 13 at a different time than each blade 41 of the other proprotor 39 passes fuselage 13.

During flight of aircraft 11, transient torque, or "crosstalk," may be experienced from one proprotor 39 to the other proprotor 39 due to certain maneuvers, such as, for example, turns. These maneuvers can cause forces on proprotors 39 that would cause one proprotor 39 to rotate faster than the other proprotor 39, but this is prevented by proprotors 39 being connected to each other by interconnect driveline 43 and forced to turn at a synchronous rotational speed. When these transient forces are encountered, a torque imbalance exists within driveline 43 between assemblies 25, 27, and significant torsional loads can be imparted on proprotors 39, mast 35, transmissions 33, and interconnect driveline 43, including spring-like torsional reactions in driveline 43. This requires components to be designed to handle these high loads, which are in addition to those normally experienced at maximum continuous power, and this typically requires components to have a larger size, higher mass, or both. The interconnect drive systems according to this disclosure are configured to reduce the load and torque experienced by interconnect drivelines, allowing the components to be designed for lower torsional load levels.

Referring now also to FIG. 3, a schematic illustration of interconnect drive system 55 of aircraft 11 is shown. Drive system 55 couples propulsion assemblies 25, 27 and comprises driveline 43 and a clutch control system 57.

As shown and described above, driveline 43 operably couples transmissions 33 of propulsion assemblies 25, 27 through driveshafts 45, 47, 49, mid-wing gearbox 51, and clutch 53. Clutch 53 is a selectively engaged coupling between driveshafts 45 and 47, with clutch 53 coupling driveshafts 45, 47 when engaged. All clutches in this disclosure can be one or a combination of several types, such as, for example, non-slip friction clutches (with dry or wet friction materials), slipper friction clutches, and positive engagement clutches (with interlocking components when engaged). Clutches according to this disclosure may also include a ratchet system. In addition, all clutches in this disclosure can be operated by one or a combination of pneumatic, hydraulic, or electromechanical systems and configured to have one or multiple plates or other coupling components. For example, clutch 53 may be a dry, slipper friction clutch that, while engaged and capable of continuously transferring torque, passively allows for a limited amount of slipping to occur between driveshafts 45, 47 when a selected transient torque load is exceeded. All clutches of this disclosure are preferably configured to fail to engagement (i.e., remain engaged after failure or move to engagement after failure), ensuring that the propulsion assemblies remain coupled together for providing proper phasing and continued flight.

Clutch control system 57 is an electronic system for operating clutch 53 in response to measured or calculated transient torque values. In the embodiment shown, system 57 comprises at least an electronic computer 59, torque/load sensors 61, and attitude/motion sensors 63. Data connection 65 provides for data transmission between sensors 61 and computer 59 and data connection 67 provides for data transmission between sensors 63 and computer 59, data connections 65, 67 allowing for measured values to be communicated to computer 59 and for computer 59 to operate sensors 61, 63. Data connection 69 provides for data transmission between computer 59 and clutch 53 of driveline 43, allowing computer 59 to send commands for operation of clutch 53 and to receive data communications from clutch 53. All data connections according to this disclosure can be wired or wireless. Computer 59 may be a standalone device or may be an integral component of flight control system 19 (FIG. 1). Torque/load sensors 61 may be, for example, strain gauges affixed to one or more of driveshafts 45, 47, 49 or torque sensor components installed between components of driveline 43. Attitude/motion sensors 63 may be, for example, one or more of a combination of gyroscopes, accelerometers, inertial guidance components, or similar devices for determining the attitude and motion of aircraft 11.

During flight, engine 29 of each propulsion assembly 25, 27 produces torque that is transferred to the associated mast 35 through gearbox 31. This torque is also transferred from transmission 33 of assembly 25 into driveshaft 45 and from transmission 33 of assembly 27 into driveshaft 49. During ideal operating conditions, the torque output in driveshafts 45, 49 is substantially balanced and proprotors 39 are continuously symmetrically indexed, at 0 degrees blade offset, or continuously phased relative to each other, for example, at 60 degrees out-of-phase. However, when one of proprotors 39 experiences a transient torque that would cause that proprotor 39 to turn faster, that torque is transferred through driveline 43 to the other proprotor 39 and would cause the other proprotor 39 to also turn faster. Due to mechanical, mass, and aerodynamic properties opposing the acceleration of the other proprotor 39, the net result is a high torque experienced by driveline 43 and components of propulsion assemblies 25, 27. Without a system to alleviate at least some of this torque imbalance, the propulsion assemblies 25, 27 and driveline 43 must be designed to accommodate these additional transient loads, resulting in a heavier and more costly aircraft 11. Limiting the transient torque loads within driveline 43 may allow driveline 43 to be designed for smaller loads and result in a lighter and less expensive aircraft 11.

When flight maneuvers induce a transient torque on one of proprotors 39, as measured by torque/load sensors 61, or is expected to induce a transient torque, as calculated by computer 59 based on data from attitude/motion sensors 63, clutch 53 permits faster rotation of one of proprotors 39 relative to the other proprotor 39 to lessen the transient torque transmitted through driveline 43. This is accomplished by allowing driveshafts 45, 47, which normally rotate at the same speed, to rotate relative to each other about their axis of rotation as driveshafts 45, 47 continue to rotate. As driveshaft 47 is coupled to driveshaft 49 through mid-wing gearbox 51, this allows for rotation of driveshafts 45, 49 relative to each other and phasing of proprotors 39. This relative rotation occurs at clutch 53 by allowing a "break" in driveline 43, and this may occur as limited, passive slippage between friction components or through active disengagement of clutch 53 as commanded by computer 59. As used herein, "disengagement" is a separation of coupling components within clutch 53 or allowing slippage by reducing the pressure applied to friction components within clutch 53. The allowed amount of relative rotation of driveshafts 45, 47 will be based on the amount and duration of the transient torque, and this is unlike the predetermined relative rotation of driveshafts 45, 47 when using clutch 53 to phase proprotors 39 by a selected angle solely for vibration attenuation, as described in the '004 application.

When the transient torque experienced by a proprotor 39 has subsided below a selected level and driveshafts 45, 47 are again rotating together with no relative motion, proprotors 39 will likely be at an undesired phase angle relative to each other. In order to return proprotors 39 to a desired phasing, clutch 53 will be commanded by computer 59 to disengage to cause a break in driveline 43 until proprotors 39 re-index to the desired phasing. The current rotational position and rotational speed of each proprotor 39 will be communicated to computer 59 from position sensors (not shown) for each proprotor 39 or each mast 35, allowing computer 59 to calculate the required duration of the disengagement of clutch 53 and providing a feedback loop for phase adjustment. A ratcheting mechanism may be used in clutch 53 to allow relative rotation of driveshafts 45, 47 in only one direction.

Figure 4:
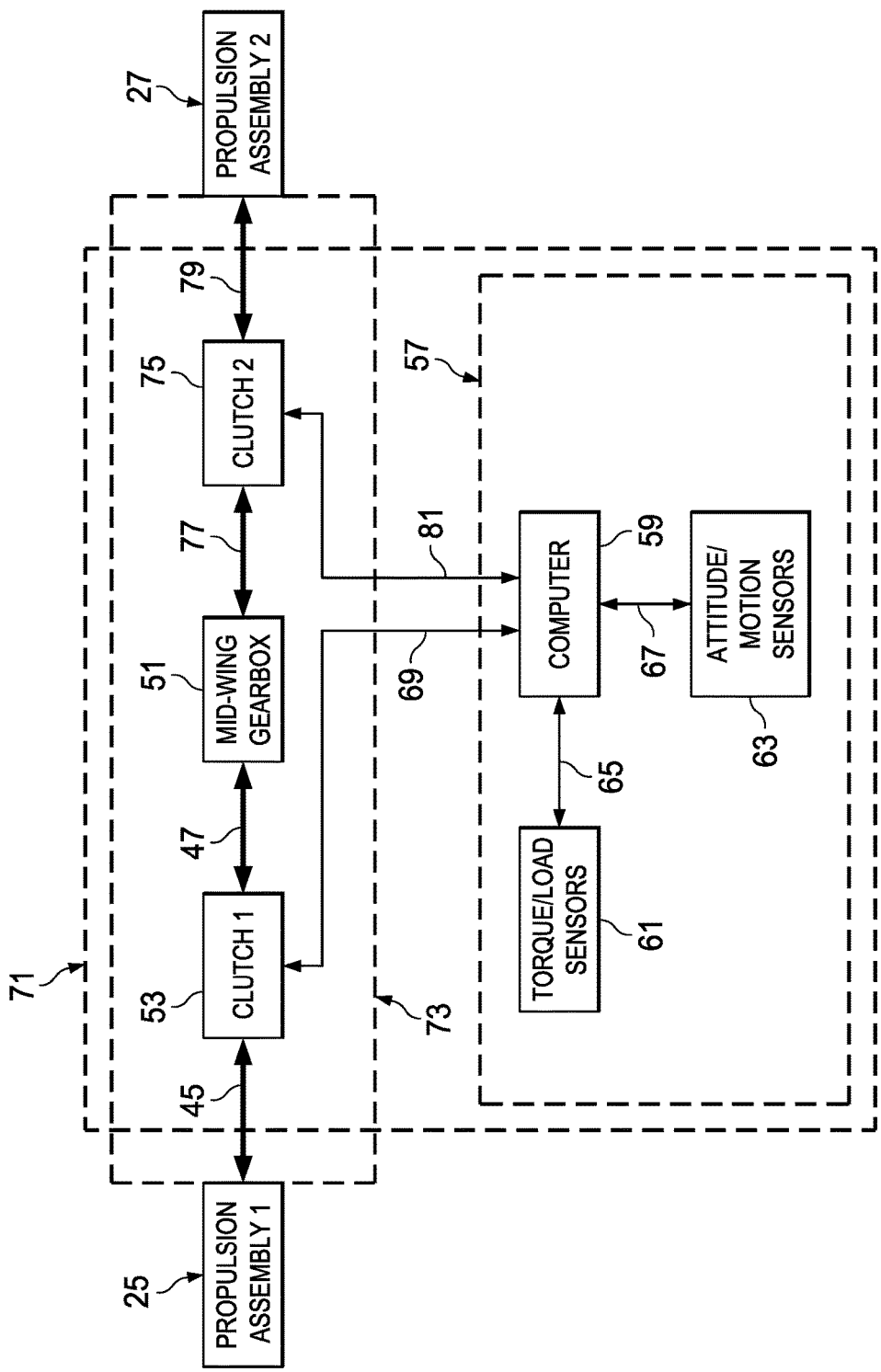
FIG. 4 is a schematic view of another embodiment of an interconnect drive system according to this disclosure.

FIG. 4 is a schematic illustration of an alternative embodiment of an interconnect drive system according to this disclosure. System 71 is configured for use with aircraft 11 for coupling propulsion assemblies 25, 27. System 71 is similar to system 55, as shown and described above, and comprises an interconnect driveline 73 and clutch control system 57. Driveline 73 comprises the components of driveline 43, with the exception of driveshaft 49 being replaced by a second clutch 75 and driveshafts 77, 79 that operably couple propulsion assembly 27 to mid-wing gearbox 51. Driveshaft 77 couples clutch 75 to gearbox 51, and driveshaft 79 couples clutch 75 to transmission 33 (not shown) of propulsion assembly 27. A wired or wireless data connection 81 provides for data transmission between computer 59 and clutch 75, and data connections 69, 81 allow computer 59 to communicate commands for operation of clutches 53, 75 and to receive data communications from clutch 53, 75. Similarly to the operation of system 55, during operation of interconnect drive system 71, one or both of clutches 53, 75 may passively slip or be commanded to disengage in response to a transient torque on one of proprotors 39, as measured by torque/load sensors 61, or a transient torque-causing event, as calculated by computer 59 based on data from attitude/motion sensors 63. One or both of clutches 53,75 can be disengaged to permit faster rotation of one of proprotors 39 relative to the other proprotor 39 for lessening the transient torque transmitted through driveline 73. This is accomplished by allowing driveshafts 45, 47 to rotate relative to each other and/or allowing driveshafts 77, 79 to rotate relative to each other in the manner described above. Clutches 53, 75 are preferably disengaged one at a time, which is all that is required to create a break in driveline 73. Though clutches 53, 75 may be disengaged simultaneously, it is preferred that at least a slip coupling is maintained in at least one clutch 53, 75 to provide for torque to be continuously transferred to mid-wing gearbox 51. Clutches 53, 75 may be operated in an equal or unequal alternating basis, though one of clutches 53, 75 may be designated as primary and the other clutch 53, 75 designated as backup, with the primary clutch 53, 75 being used exclusively until specified operating conditions are exceeded (e.g., excessive heat buildup), routine maintenance is required, or disengagement components fail. As noted above, clutches 53, 75 are configured to fail to engagement.

Figure 5:
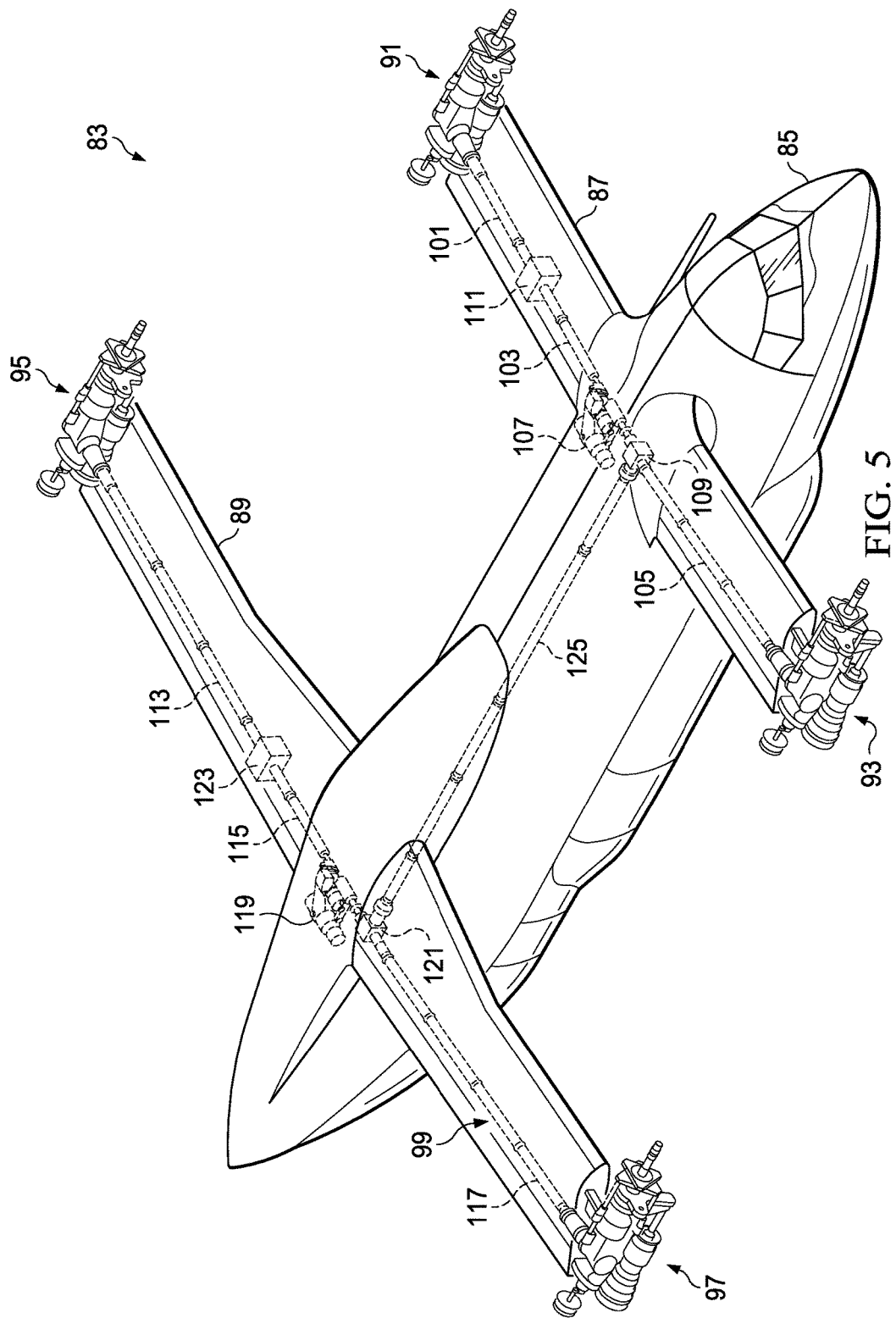
FIG. 5 is an oblique view of another tiltrotor aircraft comprising an embodiment of an interconnect drive system according to this disclosure.
Figure 6:
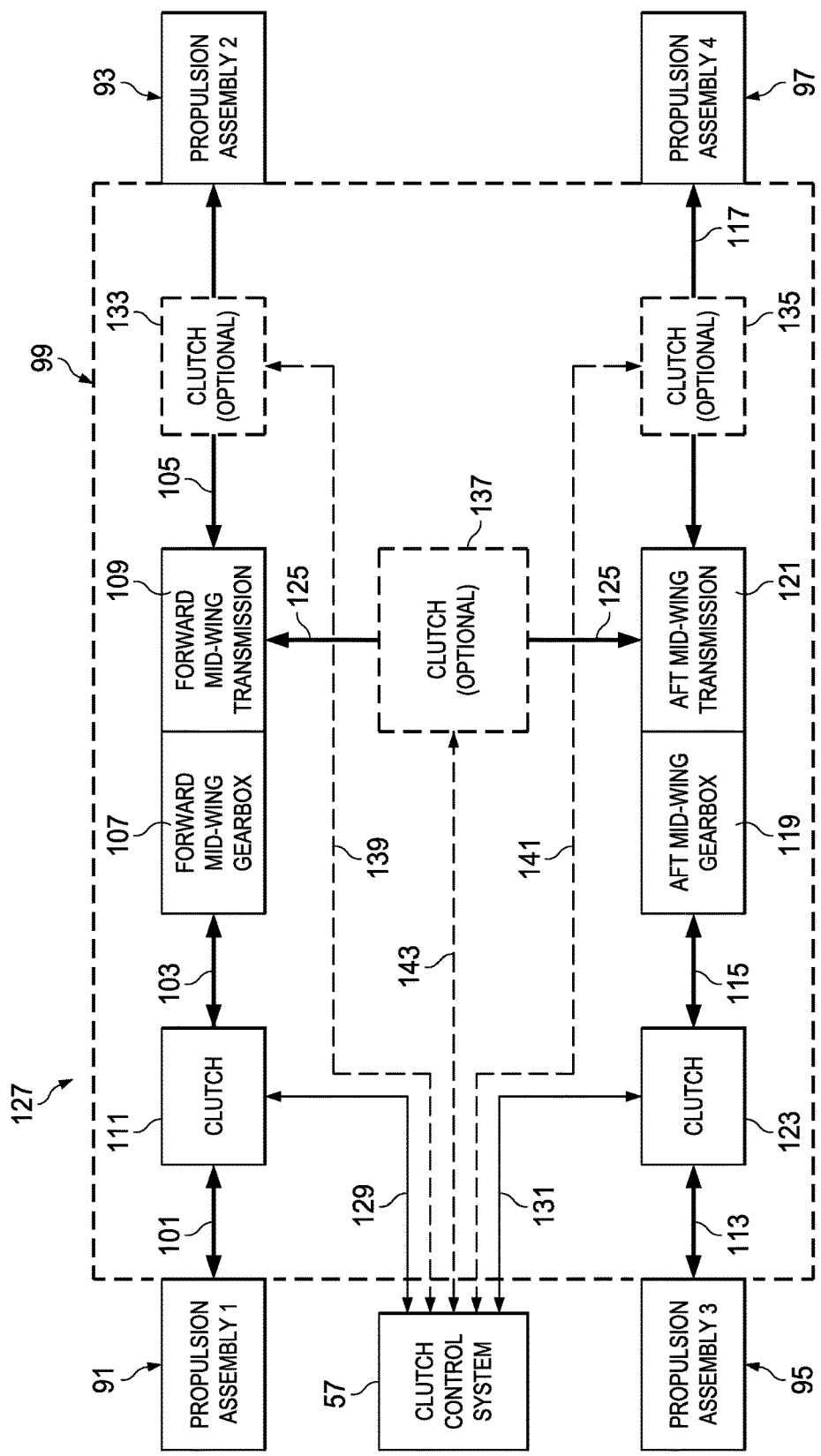
FIG. 6 is a schematic view of the drive system of the aircraft of FIG. 5.
Figure 7:
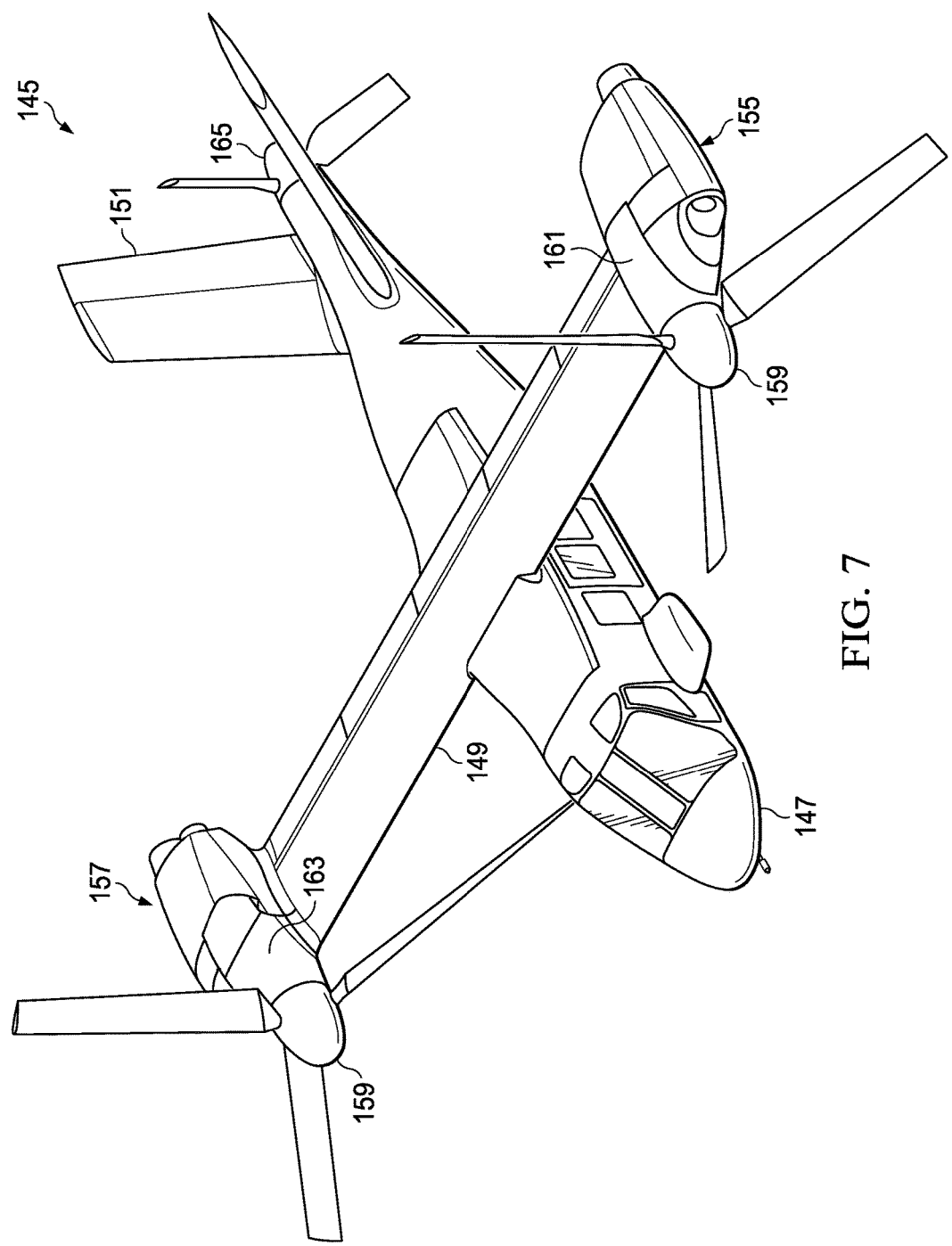
FIG. 7 is an oblique view of another tiltrotor aircraft comprising an embodiment of an interconnect drive system according to this disclosure.

FIGS. 5 and 7 illustrate tiltrotor aircraft, each comprising an alternative embodiment of an interconnect drive system according to this disclosure. The systems are shown schematically for these aircraft, respectively, in FIGS. 6 and 8.

Referring now to FIGS. 5 and 6, a quad-tiltrotor aircraft 83 (QTR) comprises fuselage 85, forward wing 87, and aft wing 89. Propulsion assemblies 91, 93 are pivotally mounted at opposing ends of forward wing 87, and propulsion assemblies 95, 97 are pivotally mounted at opposing ends of aft wing 89, each propulsion assembly 91, 93, 95, 97 having similar components as, and being configured similarly to, propulsion assemblies 25, 27 of aircraft 11. As described above for propulsion assemblies 25, 27, propulsion assemblies 91, 93, 95, 97 are each configured for driving an attached proprotor (not shown) in rotation.

An interconnect driveline 99 operably couples transmissions of propulsion assemblies 91, 93, 95, 97 for allowing torque transfer between assemblies 91, 93, 95, 97 and for maintaining a selected relative phasing of the proprotors of aircraft 83. A forward portion of driveline 99 is located within wing 87 and comprises driveshafts 101, 103, 105, mid-wing gearbox 107, mid-wing transmission 109, and clutch 111. Driveshaft 101 couples propulsion assembly 91 to clutch 111, driveshaft 103 couples clutch 111 to gearbox 107 (which is directly coupled to transmission 109), and driveshaft 105 couples propulsion assembly 93 to transmission 109. An aft portion of driveline 99 is located within wing 89 and comprises driveshafts 113, 115, 117, mid-wing gearbox 119, mid-wing transmission 121, and clutch 123. Driveshaft 113 couples propulsion assembly 95 to clutch 123, driveshaft 115 couples clutch 123 to gearbox 119 (which is directly coupled to transmission 121), and driveshaft 117 couples propulsion assembly 97 to transmission 121. A driveshaft 125 extends longitudinally between wings 87, 89 and couples transmissions 109, 121, thereby providing a torque path from each of propulsion assemblies 91, 93, 95, 97 to all other assemblies 91, 93, 95, 97. Though shown configured for a QTR, interconnect driveline 99 can be modified for use with aircraft having additional wings and/or propulsion assemblies.

FIG. 6 is a schematic illustration of interconnect drive system 127, comprising interconnect driveline 99 and clutch control system 57 (as shown and described above for systems 55, 71). A wired or wireless data connection 129 provides for data transmission between computer 59 (not shown) of system 57 and clutch 111, and wired or wireless data connection 131 provides for data transmission between computer 59 and clutch 123. As described above for systems 55, 71, data connections 129, 131 allow computer 59 to communicate commands for operation of clutches 111, 123 and to receive data communications from clutch 111, 123. One or both of clutches 111, 123 may passively slip or be commanded to disengage in response to transient torque on one of the proprotors of aircraft 83, as measured by torque/load sensors 61, or to a maneuver calculated, based on data from attitude/motion sensors 63, by computer 59 to cause a transient torque imbalance. Clutch 111 allows for the proprotor of one of propulsion assemblies 91, 93 to rotate faster than the proprotor of the other propulsion assembly 91, 93 by allowing driveshafts 101, 103 to rotate relative to each other in the manner described above. Clutch 123 allows for the proprotor of one of propulsion assemblies 95, 97 to rotate faster than the proprotor of the other propulsion assembly 95, 97 by allowing driveshafts 113, 115 to rotate relative to each other in the manner described above. It should be noted that this configuration does not provide for a break in the torque path between propulsion assemblies 93, 97, though assemblies 93, 97 will likely encounter similar transient-torque events due to being on the same side of aircraft 83. Clutches 111, 123 may be disengaged simultaneously, as propulsion assemblies 93, 97 are always coupled to mid-wing gearboxes 107, 119. As shown in broken lines in the figure, optional components include additional forward clutch 133 coupling propulsion assembly 93 to mid-wing transmission 109, additional aft clutch 135 coupling propulsion assembly 97 to mid-wing transmission 121, and central clutch 137 coupling transmissions 109, 121 to each other. Optional data connections 139, 141, 143 are used to provide data communication between computer 59 and clutches 133, 135, 137, respectively. Clutches 111, 123, 133, 135, 137 may be operated separately or in any combination to achieve the result of driving proprotors associated with propulsion systems 91, 93, 95, 97 while allowing for phasing of the proprotors to alleviate loads in driveline 99 caused by transient torque experienced by the proprotors during flight.

Figure 8:
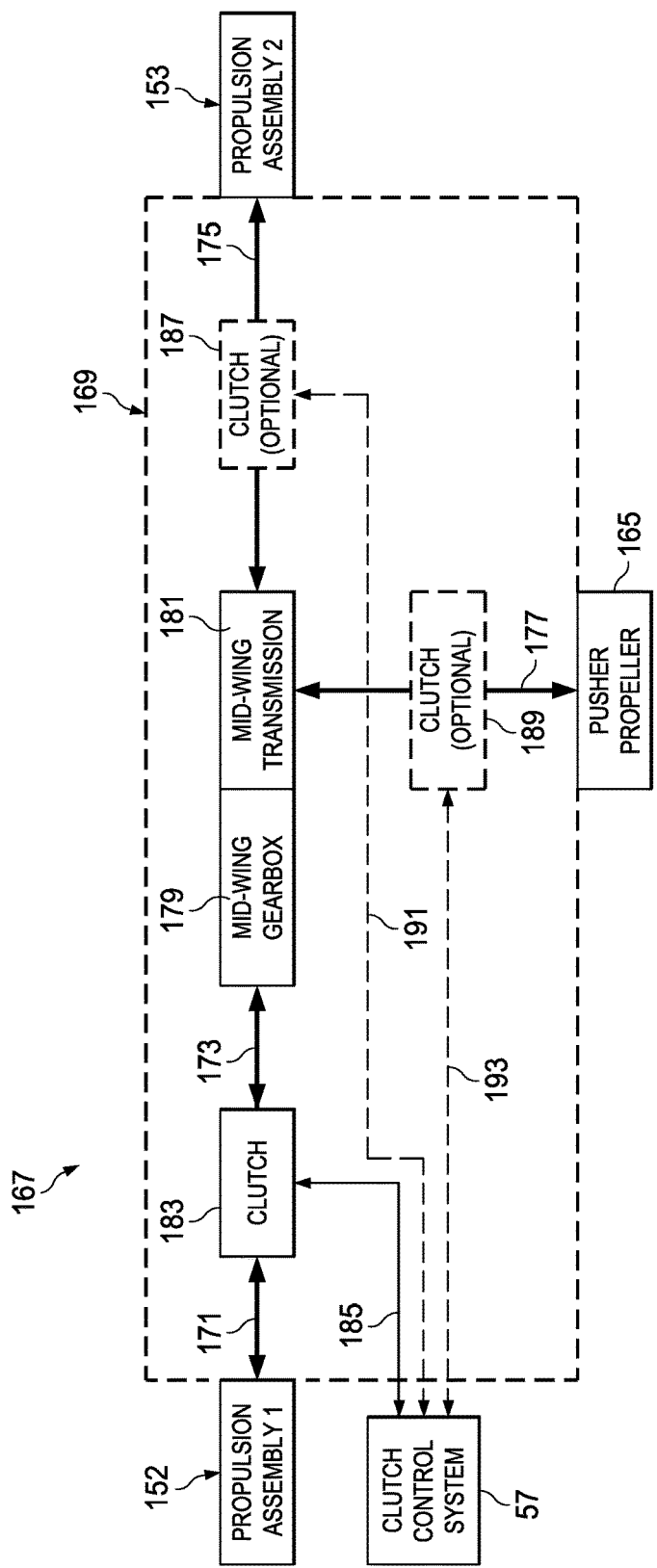
FIG. 8 is a schematic view of the drive system of the aircraft of FIG. 7.

Referring now to FIGS. 7 and 8, a tiltrotor aircraft 145 comprises fuselage 147, wing 149, and tail section 151. Propulsion assemblies 152, 153 (not visible in FIG. 7) are mounted at opposing ends of wing 149, each assembly 152, 153 comprising similar components to propulsion assemblies 25, 27 of aircraft 11 and described above. However, the engine and gearbox (not visible) of each assembly 152, 153 are carried in a fixed nacelle 155, 157, with only an associated mast (not visible) and attached proprotor 159 pivoting together on an associated pylon 161, 163 relative to wing 149. A pusher propeller 165 is mounted at the aft end of fuselage 147 for providing additional longitudinal thrust.

As shown in the schematic view of FIG. 8, an interconnect drive system 167 comprises interconnect driveline 169 and clutch control system 57 (as shown and described above for systems 55, 71, 127). Driveline 169 operably couples the transmissions of propulsion assemblies 152, 153 for allowing torque transfer between assemblies 152, 153 and propeller 165 and also for maintaining a selected relative phasing of proprotors 159. Driveline 169 comprises driveshafts 171, 173, 175, 177, mid-wing gearbox 179, mid-wing transmission 181, and clutch 183. Driveshaft 171 couples propulsion assembly 152 to clutch 183, driveshaft 173 couples clutch 183 to gearbox 179 (which is directly coupled to transmission 181), and driveshaft 175 couples propulsion assembly 153 to transmission 181. Driveshaft 177 extends longitudinally and couples mid-wing transmission 181 to propeller 165, thereby providing a torque path from each one of propulsion assemblies 152, 153 to the other assembly 152, 153 and to propeller 165.

A wired or wireless data connection 185 provides for data transmission between computer 59 (not shown) of system 57 and clutch 183. As described above for systems 55, 71, 127, data connection 185 allows computer 59 to communicate commands for operation of clutches 183 and to receive data communications from clutch 183. As shown in broken lines in the figure, optional components include additional forward clutch 187 coupling propulsion assembly 153 to mid-wing transmission 181 and central clutch 189 coupling transmissions 181 to propeller 165. Optional data connections 191, 193 are used to provide data communication between computer 59 and clutches 187, 189, respectively. Clutches 183, 187, 189 may be operated separately or in any combination to achieve the result of driving proprotors of propulsion assemblies 152, 153 while allowing for phasing of the proprotors to alleviate an imbalance of torque loads in driveline 169 caused by transient torque experienced by the proprotors during flight.

Although in the foregoing illustrations, the clutch has been shown and described as a separate component, in some embodiments, one or more clutches may be incorporated into a mid-wing gearbox, a mid-wing transmission, or a transmission of a propulsion assembly.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, R1, and an upper limit, Ru, is disclosed, any number falling within the range is specifically disclosed. In particular, the following numbers within the range are specifically disclosed: $R=R1+k*(Ru-R1)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) according to this disclosure.

What is claimed is:

1. An interconnect drive system for an aircraft having at least two propulsion assemblies, the system comprising:
   a driveline comprising:
      a shaft for each propulsion assembly, each shaft configured for being operably coupled to the associated propulsion assembly for transferring torque to and from the associated propulsion assembly; and
      a clutch operably coupling the shafts and configured for selective engagement, the clutch capable of transferring a first amount of torque between the shafts while engaged, the clutch capable of transferring a second amount of torque between the shafts while disengaged; and
   a clutch control system, comprising:
      a computer operably connected to the clutch for controlling operation of the clutch; and
      sensors for sensing torque applied to the driveline, output from the sensors being communicated to the computer;
   wherein the computer commands operation of the clutch in response to the output from the sensors, the computer commanding the clutch to disengage to relieve a transient torque imbalance in the driveline.

2. The system of claim 1, wherein the computer commands operation of the clutch to allow relative rotation of the shafts, the system being configured to achieve a selected relative phasing of rotors coupled to the propulsion assemblies.

3. The system of claim 1, wherein the sensors comprise torque sensors.

4. The system of claim 1, further comprising:
   additional sensors configured for sensing attitude and motion of the aircraft, output from the sensors being communicated to the computer;
   wherein the computer commands operation of the clutch in response to the output from the additional sensors, the computer commanding the clutch to disengage to relieve an expected transient torque imbalance in the driveline.

5. The system of claim 1, wherein the clutch is a friction clutch.

6. The system of claim 1, wherein the clutch is a slipper clutch configured to, while engaged, passively allow relative rotation of the shafts when the torque imbalance exceeds a selected limit.

7. The system of claim 1, further comprising:
a second clutch within the driveline and operably coupling the shafts, the second clutch being configured for selective engagement, the second clutch capable of transferring a first amount of torque between the shafts while engaged, the second clutch capable of transferring a second amount of torque between the shafts while disengaged.

8. A method of alleviating a least a portion of a torque imbalance within an interconnect drive system of an aircraft, the aircraft comprising at least first and second propulsion assemblies, the method comprising:
a) operably coupling the first propulsion assembly and the second propulsion assembly with a driveshaft system, the driveshaft system having a clutch operably connecting a first output driveshaft operably connected to the first propulsion assembly and a second output driveshaft operably connected to the second propulsion assembly;
b) sensing a transient torque imbalance within the driveshaft system; and
c) selectively disengaging the clutch to allow relative rotation of the first and second driveshafts to reduce the torque imbalance.

9. The method of claim 8, further comprising:
d) after the torque imbalance subsides, selectively disengaging the clutch to allow relative rotation of the first and second driveshafts to achieve a desired phasing relative to each other.

* * * * *